US009413974B2

(12) United States Patent
Kaida

(10) Patent No.: US 9,413,974 B2
(45) Date of Patent: Aug. 9, 2016

(54) INFORMATION PROCESSING APPARATUS, IMAGE SENSING APPARATUS, CONTROL METHOD, AND RECORDING MEDIUM FOR CONVERSION PROCESSING

(71) Applicant: CANON KABUSHIKI KAISHA, Tokyo (JP)

(72) Inventor: Hironori Kaida, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 92 days.

(21) Appl. No.: 14/330,580

(22) Filed: Jul. 14, 2014

(65) Prior Publication Data

US 2015/0022684 A1    Jan. 22, 2015

(30) Foreign Application Priority Data

Jul. 22, 2013   (JP) ................................. 2013-152099

(51) Int. Cl.
| H04N 5/76 | (2006.01) |
| H04N 9/68 | (2006.01) |
| H04N 9/73 | (2006.01) |
| H04N 5/235 | (2006.01) |
| H04N 5/202 | (2006.01) |

(52) U.S. Cl.
CPC ............. *H04N 5/2351* (2013.01); *H04N 5/202* (2013.01); *H04N 9/735* (2013.01)

(58) Field of Classification Search
CPC ... H04N 5/202; H04N 5/2351; H04N 5/2352; H04N 9/735; H04N 9/73; H04N 9/43; H04N 7/01; H04N 1/46; H04N 1/6027; H04N 1/6052; H04N 1/603; G01J 3/46; G01J 3/462
USPC ........... 348/231.2, 231.3, 231.6, 222.1, 223.1
See application file for complete search history.

(56) References Cited

U.S. PATENT DOCUMENTS

| 9,001,141 | B2* | 4/2015 | Glen ........................ G09G 5/02 345/502 |
| 9,219,870 | B1* | 12/2015 | Mills ..................... H04N 5/2628 |
| 2002/0030833 | A1* | 3/2002 | Kuwata ................... G06T 11/00 358/1.9 |
| 2002/0191104 | A1* | 12/2002 | Matsutani .............. H04N 9/646 348/441 |
| 2003/0185437 | A1* | 10/2003 | Nakami ............... H04N 1/6058 382/162 |
| 2004/0212783 | A1* | 10/2004 | Wada ....................... H04N 9/73 353/31 |
| 2005/0062756 | A1* | 3/2005 | Dyke ...................... G09G 5/02 345/604 |
| 2005/0063586 | A1* | 3/2005 | Munsil ................. H04N 1/4053 382/162 |
| 2006/0152612 | A1* | 7/2006 | Asada ................ H04N 5/23293 348/333.01 |

(Continued)

FOREIGN PATENT DOCUMENTS

JP        2002-010178 A    1/2002

*Primary Examiner* — Chia-Wei A Chen
(74) *Attorney, Agent, or Firm* — Cowan, Liebowitz & Latman, P.C.

(57) ABSTRACT

An information processing apparatus obtains a sensed image, and information representing imaging conditions used when the image was sensed. Based on the information representing the imaging conditions, the information processing apparatus generates conversion information corresponding to a conversion coefficient used in at least one of de-gamma processing and color balance correction processing for converting the sensed image into an image corresponding to a predetermined color response function. The information processing apparatus records the generated conversion information in association with the sensed image.

12 Claims, 10 Drawing Sheets

ESTIMATION OF TYPE OF LIGHT SOURCE BASED ON R/G AND B/G COEFFICIENTS

(56) References Cited

U.S. PATENT DOCUMENTS

| | | | | |
|---|---|---|---|---|
| 2008/0151108 A1* | 6/2008 | Doswald | H04N 7/0112 | 348/456 |
| 2009/0103806 A1* | 4/2009 | Nakami | H04N 1/6086 | 382/167 |
| 2009/0290067 A1* | 11/2009 | Ishiga | G06T 5/50 | 348/607 |
| 2010/0066868 A1* | 3/2010 | Shohara | G06K 9/40 | 348/241 |
| 2011/0013208 A1* | 1/2011 | Bhaskaran | H04N 1/6027 | 358/1.9 |
| 2011/0050931 A1* | 3/2011 | Fujiyama | H04N 5/23245 | 348/220.1 |
| 2011/0187897 A1* | 8/2011 | Nakajima | H04N 1/00973 | 348/231.6 |
| 2012/0327262 A1* | 12/2012 | Arakawa | H04N 5/232 | 348/222.1 |
| 2013/0064436 A1* | 3/2013 | Tanaka | A61B 1/00009 | 382/128 |
| 2013/0278796 A1* | 10/2013 | Ordoubadian | H04N 1/2112 | 348/231.6 |
| 2014/0368696 A1* | 12/2014 | Uchida | H04N 5/3651 | 348/234 |

* cited by examiner

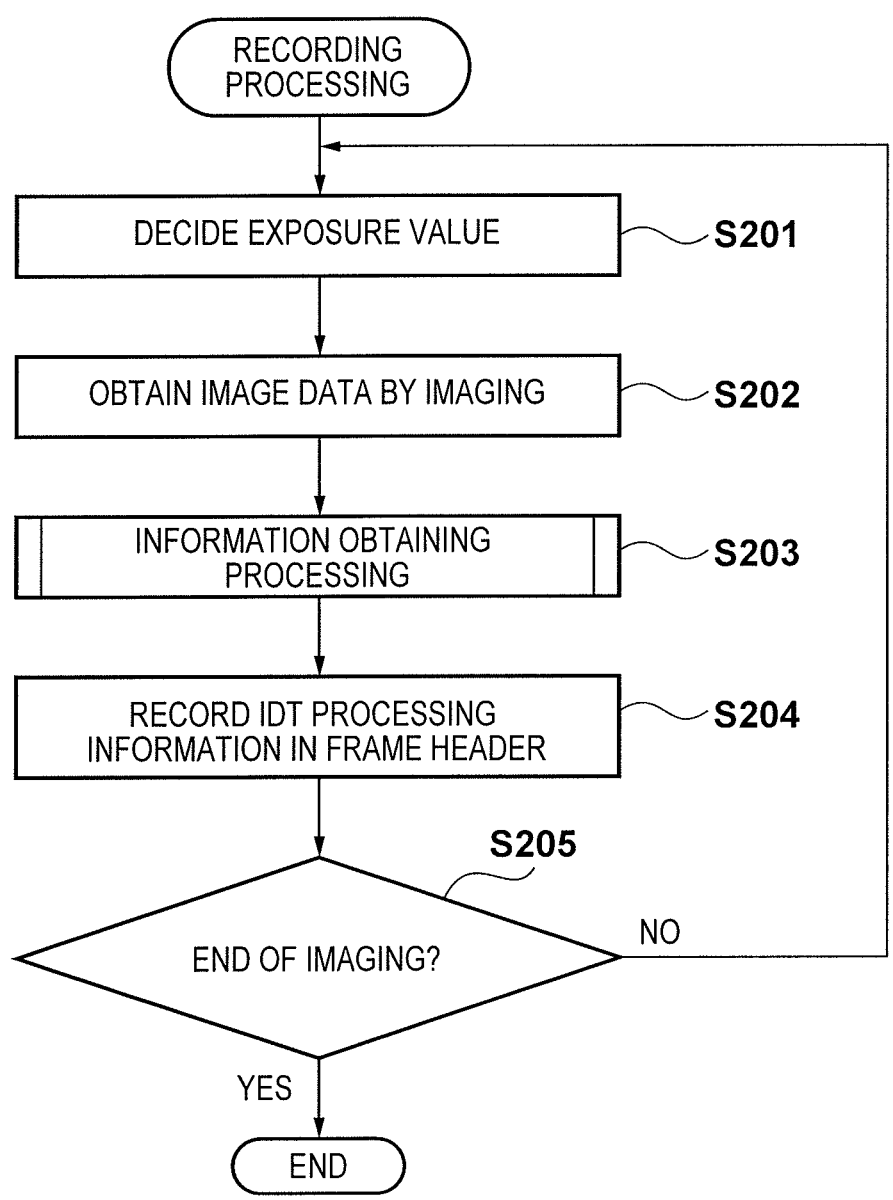

GAMMA CORRECTION PROCESSING
(INPUT VALUE - OUTPUT VALUE)

COLOR BALANCE CORRECTION
(XY CHROMATICITY DIAGRAM)

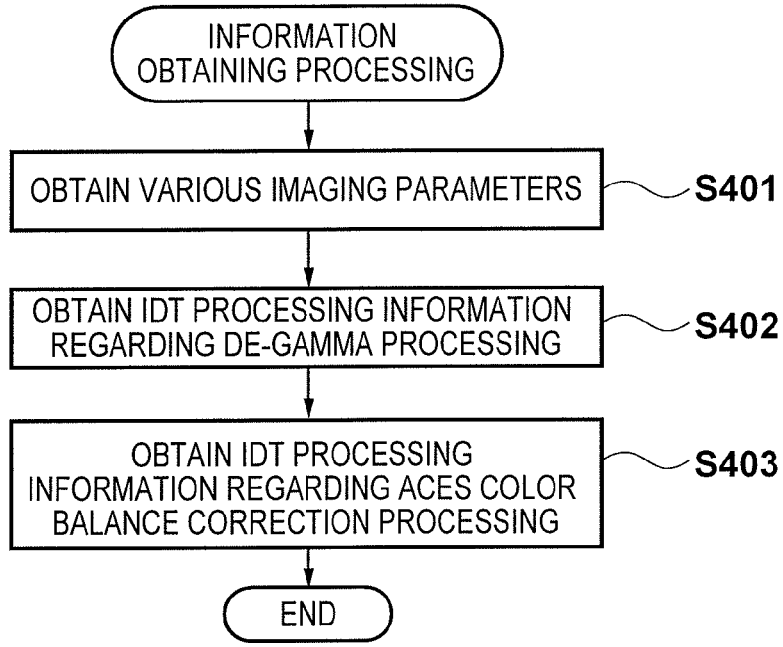
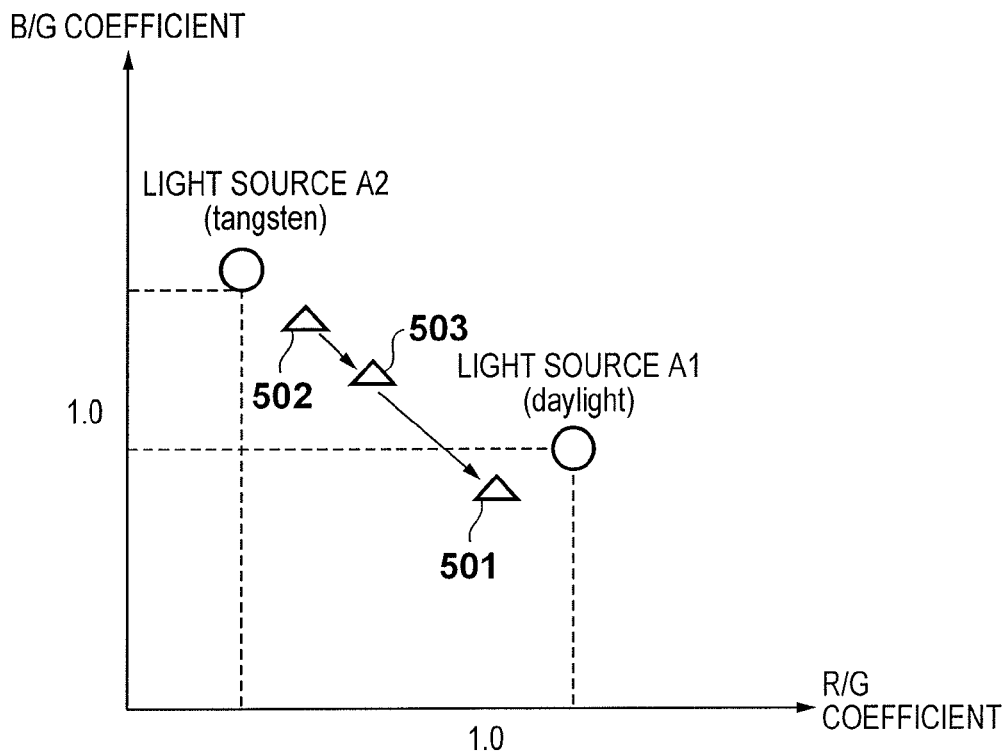

| LIGHT SOURCE A1/ FILTER B3 | LIGHT SOURCE A2/ FILTER B3 | LIGHT SOURCE A3/ FILTER B3 |
|---|---|---|
| LIGHT SOURCE A1/ FILTER B2 | LIGHT SOURCE A2/ FILTER B2 | LIGHT SOURCE A3/ FILTER B2 |
| LIGHT SOURCE A1/ FILTER B1 | LIGHT SOURCE A2/ FILTER B1 | LIGHT SOURCE A3/ FILTER B1 |
| LIGHT SOURCE A1/ NO FILTER | LIGHT SOURCE A2/ NO FILTER | LIGHT SOURCE A3/ NO FILTER |

FIG. 6A

| FILTER B1 | FILTER B2 | FILTER B3 |
|---|---|---|
| LIGHT SOURCE A1 | LIGHT SOURCE A2 | LIGHT SOURCE A3 |

FIG. 6B

INFORMATION PROCESSING APPARATUS, IMAGE SENSING APPARATUS, CONTROL METHOD, AND RECORDING MEDIUM FOR CONVERSION PROCESSING

BACKGROUND OF THE INVENTION

1. Field of the Invention

The present invention relates to an information processing apparatus, image sensing apparatus, control method, and recording medium, and particularly to generation of image data to which input response characteristic conversion processing complying with the Academy Color Encoding Specification is applied.

2. Description of the Related Art

Recently, images and moving images serving as digital data are presented to viewers in various scenes including a movie show. When an image to be presented is data imaged by an image sensing apparatus such as a digital camera, the image represents a color output corresponding to the characteristic of the image sensing apparatus. That is, the image represents a different color response under the influence of the model or individual difference of the image sensing apparatus, an optical member such as a lens mounted in imaging, applied conversion processing, or the like. In this manner, the color response of image data changes depending on conditions in imaging. Especially when image data are sequentially presented by using an image presentation apparatus such as a projector at a screening of a movie, different impressions may be given to viewers between images obtained under different conditions in imaging.

To solve this, in creation/editing of digital data of a movie to be screened, different color conversion processes are applied for respective image sensing apparatuses used in imaging so as to exhibit, for example, a uniform color response in the same scene. That is, processing of removing (or reducing) a change of the color response arising from the individual difference or settings of an image sensing apparatus or the like is applied. The Academy of Motion Picture Arts and Sciences of America (to be referred to as the Academy hereinafter) has proposed the Academy Color Encoding Specification (ACES) which defines an ideal color response function or the like by an image sensor. This specification includes implementation of a uniform color response independent of conditions in imaging. More specifically, conversion into a color balance complying with an ideal color response function is implemented by performing, on image data, Input Device Transform (IDT) processing considering various parameters in imaging.

ACES IDT processing requires parameters (imaging parameters) representing conditions in imaging for respective image data. Factors which deviate, from an ideal color response function, the color balance of image data obtained by imaging are, for example, the difference of the image sensor, the lens tint and applied color filter in imaging, and a correction parameter applied to image data. In IDT processing, an IDT conversion coefficient is decided in accordance with imaging parameters serving as these deviation factors. The decided IDT conversion coefficient is applied to image data to convert it into image data corresponding to an ideal color response function.

However, there has not been an image sensing apparatus which outputs, for IDT processing in an external apparatus, imaging parameters necessary to decide an IDT conversion coefficient. Japanese Patent Laid-Open No. 2002-010178 has disclosed a technique of adding, to image data, imaging parameters including attribute information such as exposure information. However, these imaging parameters cannot be used in IDT processing, unlike the above-mentioned parameters necessary to decide an IDT conversion coefficient. For example, when editing a video, the user needs to decide an IDT conversion coefficient by referring to conventional imaging parameters, and apply IDT processing to image data in an external apparatus.

SUMMARY OF THE INVENTION

The present invention was made in view of such problems in the conventional technique. The present invention provides an information processing apparatus, image sensing apparatus, control method, and recording medium for generating image data capable of preferably implementing input response characteristic conversion processing.

According to one aspect of the present invention, there is provided an information processing apparatus comprising: an obtaining unit configured to obtain a sensed image, and information representing an imaging condition used when the image was sensed; a generation unit configured to generate, based on the information representing the imaging condition, conversion information corresponding to a conversion coefficient used in conversion processing of converting the sensed image into an image corresponding to a predetermined color response function independent of an image sensing apparatus; and a recording unit configured to record, in association with the sensed image, the conversion information generated by the generation unit, wherein the conversion processing includes at least one of de-gamma processing and color balance correction processing.

According to another aspect of the present invention, there is provided an image sensing apparatus comprising: an image sensing unit; an obtaining unit configured to, when the image sensing unit performs imaging, obtain information representing an imaging condition in imaging; a generation unit configured to generate, based on the information representing the imaging condition, conversion information corresponding to a conversion coefficient used in conversion processing of converting the sensed image into an image corresponding to a predetermined color response function independent of an image sensing apparatus; and a recording unit configured to record, in association with the sensed image, the conversion information generated by the generation unit, wherein the conversion processing includes at least one of de-gamma processing and color balance correction processing.

According to still another aspect of the present invention, there is provided an information processing apparatus control method, comprising: an obtaining step of obtaining a sensed image, and information representing an imaging condition used when the image was sensed; a generation step of generating, based on the information representing the imaging condition, conversion information corresponding to a conversion coefficient used in conversion processing of converting the sensed image into an image corresponding to a predetermined color response function independent of an image sensing apparatus; and a recording step of recording, in association with the sensed image, the conversion information generated in the generation step, wherein the conversion processing includes at least one of de-gamma processing and color balance correction processing.

Further features of the present invention will become apparent from the following description of exemplary embodiments (with reference to the attached drawings).

BRIEF DESCRIPTION OF THE DRAWINGS

FIG. 2 is a flowchart exemplifying recording processing to be executed in a digital video camera 100 according to the first embodiment of the present invention;

FIG. 4 is a flowchart exemplifying information obtaining processing to be executed in the digital video camera 100 according to the embodiment of the present invention;

FIG. 5 shows an example of an XY chromaticity diagram used to specify the type of light source according to the embodiment of the present invention;

FIGS. 6A and 6B are views exemplifying a color balance transformation matrix configuration method according to the first embodiment of the present invention;

DESCRIPTION OF THE EMBODIMENTS

[First Embodiment]

An exemplary embodiment of the present invention will now be described in detail with reference to the accompanying drawings. An embodiment to be described below will explain an example in which the present invention is applied to, as an example of an information processing apparatus, a digital video camera configured to associate parameters (Input Device Transform (IDT) processing information) necessary for IDT processing with image data to be used in IDT processing, and record them. However, the present invention is applicable to an arbitrary apparatus capable of associating parameters necessary for IDT processing with image data to be used in IDT processing, and recording them.

<<Arrangement of Digital Video Camera>>

Figure 1:
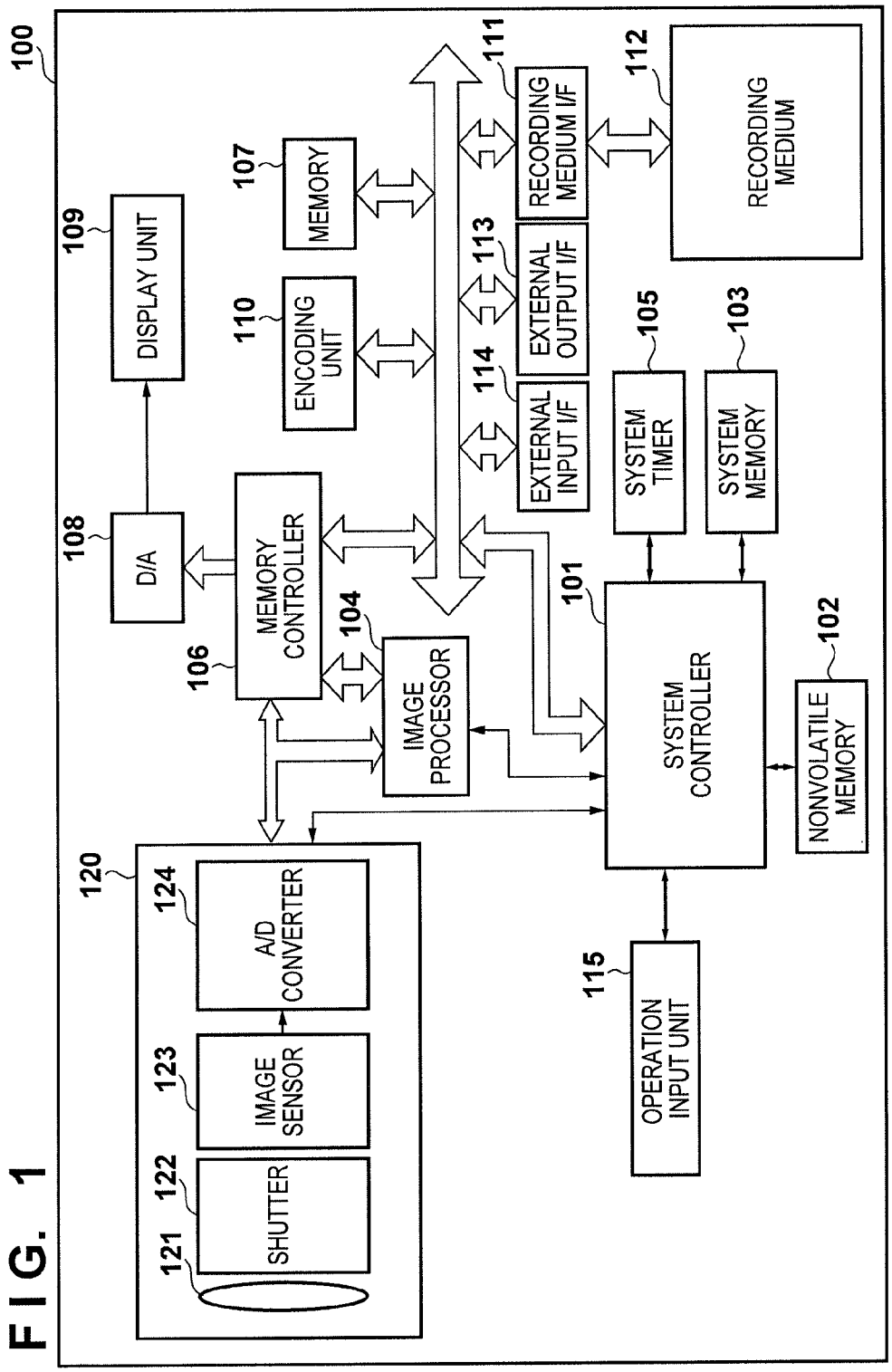
FIG. 1 is a block diagram showing the functional arrangement of a digital video camera 100 according to an embodiment of the present invention.

FIG. 1 is a block diagram showing the functional arrangement of a digital video camera 100 according to the embodiment of the present invention.

A system controller 101 is, for example, a CPU. The system controller 101 controls the operation of each block of the digital video camera 100. More specifically, the system controller 101 controls the operation of each block by reading out the operation program of each block of the digital video camera 100 that is stored in, for example, a nonvolatile memory 102, loading the program to a system memory 103, and executing it.

The nonvolatile memory 102 is, for example, an electrically erasable/recordable memory such as an EEPROM. The nonvolatile memory 102 stores the operation program of each block of the digital video camera 100, and in addition, parameters and the like necessary in the operation of each block. The system memory 103 is, for example, a volatile memory such as a RAM. In the embodiment, the nonvolatile memory 102 stores information necessary to generate IDT processing information (to be described later). The system memory 103 is used not only as a loading area for the operation program of each block, but also as a storage area for temporarily storing intermediate data and the like output in the operation of each block.

A system timer 105 is a timer incorporated in the digital video camera 100. The system timer 105 is used for measurement of the elapsed time, the time stamp, and the like in each program or processing executed by the system controller 101.

An image sensing unit 120 is a unit which images an object and outputs image data. The image sensing unit 120 includes an imaging lens 121, shutter 122, image sensor 123, and A/D converter 124. The imaging lens 121 is an imaging lens group of the digital video camera 100 including a focus lens, zoom lens, and color filter. The imaging lens 121 forms an optical image on the image sensor 123 via the shutter 122 having the diaphragm and ND filter functions. The image sensor 123 is, for example, an image sensor such as a CCD or CMOS sensor. The image sensor 123 converts an optical image formed via the imaging lens 121 into an analog image signal, and outputs the analog image signal to the A/D converter 124. The A/D converter 124 applies A/D conversion processing to the analog image signal input from the image sensor 123, converting the analog image signal into a digital image signal (image data/frame).

An image processor 104 applies various image conversion processes to image data output from the image sensing unit 120, or image data read out from a memory 107 by a memory controller 106 (to be described later). These image conversion processes include predetermined pixel interpolation processing, resize processing such as reduction, and color conversion processing. The image processor 104 executes arithmetic processing regarding exposure control and distance measurement control by using image data input from the A/D converter 124 upon imaging. The image processor 104 outputs the arithmetic result to the system controller 101. Based on the arithmetic result, the system controller 101 operates the imaging lens 121 and shutter 122 by a driving system (not shown) to perform exposure control and distance measurement control.

Assume that the digital video camera 100 according to the embodiment employs TTL (Through The Lens) AF (Auto Focus) processing and AE (Auto Exposure) processing. In AE processing, control of the shutter speed, diaphragm, and ND filter, and control of a gain applied to a digital image signal in the image processor 104 are performed. The image processor 104 performs predetermined arithmetic processing by using sensed image data, and executes even TTL AWB (Auto White Balance) processing based on the obtained arithmetic result.

In AWB processing, first, the image processor 104 divides image data output from the image sensing unit 120 into a plurality of subblock regions. The image processor 104 searches each divided subblock region for white, and decides the R, G, and B ratio coefficients of image data so that a subblock in which white has been detected becomes white in data. The R, G, and B ratio coefficients are stored as white balance detection values in the memory 107.

In the following description, AF processing, AE processing, and AWB processing are executed in real time in use in a mode in which a normal moving image is sensed in the digital video camera 100. However, when the auto execution setting is canceled, the user can manually set the parameter of each processing.

The memory controller 106 is a block which controls readout of information from the memory 107 and write of information in the memory 107. The memory controller 106 writes, in the memory 107, a digital image signal input from the A/D converter 124, or an image signal output upon applying various processes by the image processor 104. In addition to images regarding frames of a moving image during imaging, information of a sound during imaging is also written in the memory 107. To store this information, the memory 107 is designed to have a sufficient storage capacity.

In addition to an image obtained by imaging, a display image to be displayed on a display unit 109 (to be described later) is also written in the memory 107. When displaying the display image on the display unit 109, the display image is read out from the memory 107, and output to a D/A converter 108 (to be described later) in order to display the display image on the display unit 109.

The D/A converter 108 applies D/A conversion processing to an input digital image signal, and outputs an obtained analog image signal to the display unit 109 to display it. The display unit 109 is, for example, a display device such as a compact LCD, and displays an analog image signal output from the D/A converter 108. Note that the display unit 109 functions as an electronic viewfinder by inputting, to the D/A converter 108, digital image signals sequentially output from the A/D converter 124 by imaging, converting again them into analog image signals, and displaying (live view-displaying) the analog image signals.

An operation input unit 115 is a user interface of the digital video camera 100, including a power button, mode switching SW, and imaging button. When the operation input unit 115 detects that the user has operated each operation member, it transmits a control signal corresponding to this operation to the system controller 101.

A recording medium I/F 111 is an interface for connecting the digital video camera 100 and a recording medium 112 such as a memory card or HDD, which is a recording device detachably connected to the digital video camera 100. The recording medium 112 records, for example, via the recording medium I/F 111, data and sound of a moving image which has been encoded by an encoding unit 110 in accordance with a predetermined encoding format such as MPEG.

An external output I/F 113 is, for example, an external output terminal and is an output interface for image data to an external device of the digital video camera 100. Image data to be externally output is not limited to image data recorded on the recording medium 112, but may be image data stored in the memory 107 or image data output from the image sensing unit 120. An external input I/F 114 is, for example, an external input terminal and is an input interface for receiving, from an external device, various kinds of information and the like to be used in IDT processing.

<<Recording Processing>>

As for recording processing of recording a moving image in the digital video camera 100 having the above arrangement according to the embodiment, detailed processing will be explained with reference to the flowchart of FIG. 2. In the following description, this recording processing starts when, for example, a moving image sensing instruction is issued in the digital video camera 100.

In step S201, the system controller 101 obtains the result of arithmetic processing by the image processor 104, and decides an exposure value. The exposure value is a controlled variable regarding the image sensing unit 120, including the shutter speed, the opening amount of the diaphragm, and the ISO sensitivity setting.

In step S202, the system controller 101 sets the decided exposure value in the image sensing unit 120, and causes the image sensing unit 120 to output image data serving as a frame of a moving image by imaging.

In step S203, the system controller 101 executes information obtaining processing to obtain IDT processing information for the image data obtained by imaging. In the embodiment, in IDT processing to be executed in a PC (to be described later), three conversion processes, that is, de-gamma processing, ACES color balance correction processing, and ACES color space conversion processing are performed. In the information obtaining processing executed in this step, imaging parameters necessary to decide an IDT coefficient are obtained in these three conversion processes.

<IDT Processing Information>

The three conversion processes to be executed in IDT processing, and imaging parameters necessary for the respective processes will be explained with reference to the drawings.

Figure 3A:
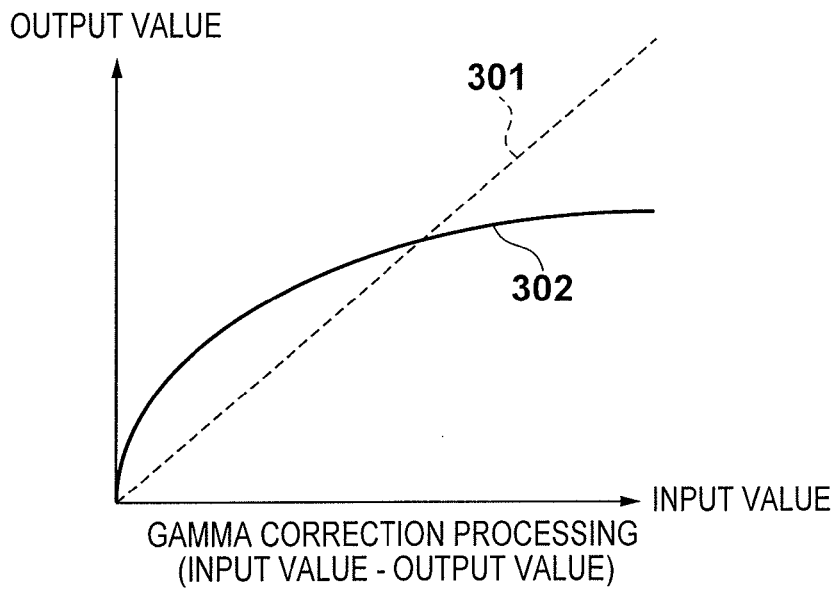
FIGS. 3A and 3B are graphs for explaining imaging parameters necessary for IDT processing to be executed in a PC 700 according to the embodiment of the present invention.

De-gamma processing as one IDT processing is processing of removing, from image data, the influence of gamma correction processing applied to image data by the image processor 104 in the digital video camera 100. In gamma correction processing, conversion is performed for easy visual recognition of the dark and bright portions of an image by, for example, mapping a pixel representing a low tone in a wide tone region and to the contrary, mapping a pixel representing a high tone in a lower, narrow tone region. More specifically, as shown in FIG. 3A, the input and output of the tone value do not change generally, as indicated by a straight line 301. However, correction is performed to decrease the output of a bright portion and increase that of a dark portion, as indicated by a curve 302. As a result of gamma correction processing, the frame of a moving image to be recorded on the recording medium 112 exhibits a color output different from that of image data output from the image sensor 123. To grasp the influence of the image sensor and optical system in conversion for adaptation to an ideal color response function of the ACES (Academy Color Encoding Specification), it is necessary to perform de-gamma processing of excluding the influence of gamma correction processing in IDT processing, and then perform another color conversion processing. IDT processing information regarding the applied gamma correction processing may be obtained from, for example, an LUT (Look Up Table) for converting the RGB value of image data after correction into a value before correction at which the input and output have a one-to-one correspondence.

Figure 3B:
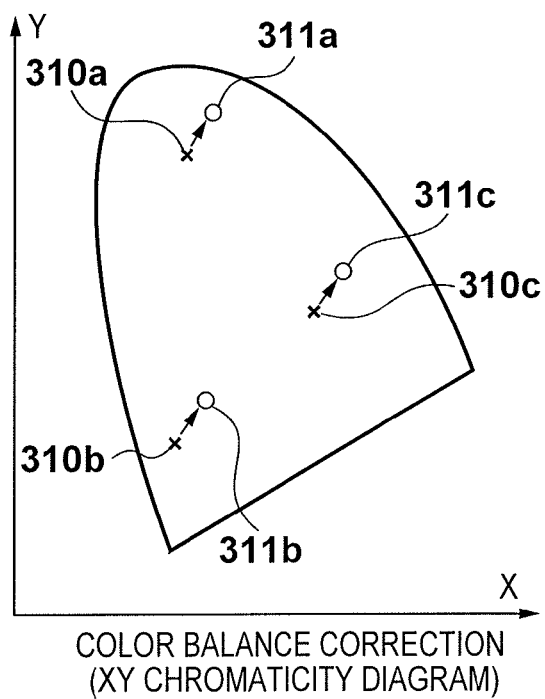

In ACES color balance correction processing serving as another IDT processing, image data is corrected so that the color balance of image data comes close to a color balance which is defined by the ACES and is faithful to the visual characteristic. The color balance faithful to the visual characteristic is a color balance corresponding to an ideal color response function of the ACES. As described above, the color balance of image data deviates from a color balance faithful to the visual characteristic owing to light source information, camera settings (white balance, gamma, and clip), an imaging optical system used (lens tint and built-in color filter), and the like in imaging. More specifically, as shown in the XY chromaticity diagram of FIG. 3B, the R, G, and B pixel values of image data to be recorded in the digital video camera 100 are originally points 310*a*, 310*b*, and 310*c*, but are changed to points 311*a*, 311*b*, and 311*c* owing to the aforementioned factors. To execute ACES color balance correction processing in IDT processing and bring image data close to a color balance (target value) faithful to the visual characteristic, a transformation matrix to the target value is associated as IDT processing information with the image data in the embodiment. The transformation matrix is a matrix such as:

$$A_{source} = \begin{bmatrix} a_{11} & a_{12} & a_{13} \\ a_{21} & a_{22} & a_{23} \\ a_{31} & a_{32} & a_{33} \end{bmatrix}$$

By multiplying the R, G, and B values of image data by the transformation matrix:

$$\begin{bmatrix} R' \\ G' \\ B' \end{bmatrix} = A_{source} \begin{bmatrix} R \\ G \\ B \end{bmatrix}$$

R', G', and B' values close to an ideal color response can be obtained. It will readily occur that the color balance conversion information is not limited to the transformation matrix, and an LUT or the like is usable.

In ACES color space conversion processing serving as the final IDT processing, the color space of image data is converted into a color space defined by the ACES. As described above, the ACES defines an ideal color response function by an image sensor. In addition to this aspect, the ACES defines a common format (ACES format) when performing corresponding processing. That is, in ACES color space conversion processing, the color space of image data is converted into a color space defined by the ACES format. For example, when image data has R, G, and B values (709RGB) in an ITU-R BT.709 color space, the R, G, and B values are converted once into those in the XYZ color space, and then converted from the R, G, and B values in the XYZ color space into R, G, and B values (ACES_RGB) in the ACES color space. In the embodiment, therefore, a transformation matrix $M_{709 \rightarrow RGB}$, which defines color space conversion in two stages:

$$\begin{bmatrix} R_{ACES} \\ G_{ACES} \\ B_{ACES} \end{bmatrix} = M_{709 \rightarrow ACES} \begin{bmatrix} R_{709} \\ G_{709} \\ B_{709} \end{bmatrix}$$

is associated as IDT processing information with image data. The embodiment describes that the transformation matrix regarding conversion of the color space is associated as IDT processing information with image data. However, the practice of the present invention is not limited to this. If the color space of a conversion source is determined in color space conversion, the conversion is always constant, so information of the color space of image data may be associated as IDT processing information with the image data. Alternatively, when the color space of image data is turned out in advance, IDT processing information regarding ACES color space conversion processing may not be associated with image data.

<Information Obtaining Processing>

Next, information obtaining processing to be executed in the digital video camera 100 according to the embodiment will be explained in detail with reference to the flowchart of FIG. 4.

In step S401, the system controller 101 obtains various imaging parameters regarding IDT processing information. These imaging parameters include camera setting data such as the white balance coefficient, gamma correction coefficient, gain, ISO sensitivity setting in imaging, frame rate, clip, diaphragm, and focal position which have been applied to image data. These parameters also include mounting data regarding the imaging optical system, such as the angle of field of a lens mounted in imaging, a color filter, and the color balance of the lens.

In step S402, the system controller 101 refers to information regarding gamma correction out of the obtained parameters, and obtains IDT processing information, that is, an LUT regarding de-gamma processing. The shape of a gamma curve to be converted by gamma correction is determined by the gamma correction coefficient, gain value, ISO sensitivity, and the like. By referring to these pieces of information, the system controller 101 specifies a gamma curve and obtains IDT processing information regarding de-gamma processing.

In step S403, the system controller 101 refers to information regarding the color balance out of the obtained parameters, and obtains IDT processing information, that is, a color balance transformation matrix regarding ACES color balance correction processing.

For example, an outline of processing of obtaining a color balance transformation matrix based on estimation of the type of light source and the type of color filter applied in the imaging optical system will be explained with reference to the drawings.

First, the system controller 101 specifies the type of light source by using a white balance coefficient (R, G, and B ratio coefficients) which has been decided by the image processor 104 based on analysis of obtained image data. In the digital video camera 100 according to the embodiment, a white balance coefficient in white balance coefficient information is determined in advance as a preset for a light source for which white balance adjustment is assumed. The type of light source is specified as follows: the white balance coefficient of image data is mapped in a two-dimensional space defined by an abscissa representing the R ratio coefficient/G ratio coefficient and an ordinate representing the B ratio coefficient/G ratio coefficient. Then, the white balance coefficient of a predetermined light source to which the mapped white balance coefficient is closer is determined. FIG. 5 shows this two-dimensional space. In the example of FIG. 5, a light source A1 (daylight) and light source A2 (tungsten) represent the white balance coefficients of preset light sources. When a white balance coefficient decided based on analysis of image data is mapped at, for example, the position of a point 501 in FIG. 5, the type of light source in imaging is specified as the light source A1, that is, daylight.

Also, the system controller 101 specifies the type of color filter by referring to color filter information out of various obtained parameters. When color filter information cannot be mechanically obtained, this information may be information input by a user setting or the like.

Based on a combination of the type of light source and the type of color filter, the system controller 101 obtains a corresponding transformation matrix as IDT processing information out of predetermined color balance transformation matrices. For example, the color balance transformation matrix suffices to be determined in advance for each combination of the type of light source and the color filter, and stored as a table in the memory 107, as shown in FIG. 6A. For example, the transformation matrix suffices to be generated based on a conversion coefficient into an ideal ACES color balance target value for image data obtained by imaging in advance a color chart such as a Macbeth chart in the digital video camera 100.

Note that the color balance transformation matrix may be determined not for the decoding condition of the above-mentioned factor which causes deviation from an ideal color balance, but for each factor. For example, a change of the color balance arising from the difference in the type of light source, and a change of the color balance arising from the difference in the type of color filter are generated independently. For this reason, transformation matrices may be defined separately for the type of light source and the type of color filter, as shown in FIG. 6B.

After obtaining various kinds of IDT processing information in this manner, the system controller 101 terminates the information obtaining processing, and returns the process to recording processing. In the information obtaining processing, no detailed processing is described for IDT processing information regarding ACES color space conversion processing. However, IDT processing information suffices to contain a predetermined transformation matrix.

In step S204, the system controller 101 sets the IDT processing information obtained by information obtaining processing in the frame header of image data serving as a frame of a moving image, and records it on the recording medium 112 via the recording medium I/F 111. The embodiment describes that IDT processing information is contained in the frame header and recorded. However, the practice of the present invention is not limited to this, and IDT processing information may be recorded as another file associated with moving image data.

In step S205, the system controller 101 determines whether a moving image sensing end instruction has been issued. If the system controller 101 determines that a moving image sensing end instruction has been issued, it terminates the recording processing. If the system controller 101 determines that no moving image sensing end instruction has been issued, it returns the process to step S201.

By this processing, the digital video camera 100 according to the embodiment can generate moving image data associated with IDT processing information necessary to execute IDT processing in an external apparatus. The IDT processing information contains pieces of information necessary for de-gamma processing, ACES color balance correction processing, and ACES color space conversion processing. By executing IDT processing using these pieces of information in the external apparatus, the moving image data can be converted into moving image data adapted to an ideal color response function defined by the ACES.

<<IDT Processing>>

Next, an operation when executing IDT processing on moving image data obtained as a result of recording processing in the digital video camera 100 in the above-described manner will be explained. The embodiment describes that a PC 700 serving as an external apparatus executes IDT processing.

<Arrangement of PC 700>

Figure 7:
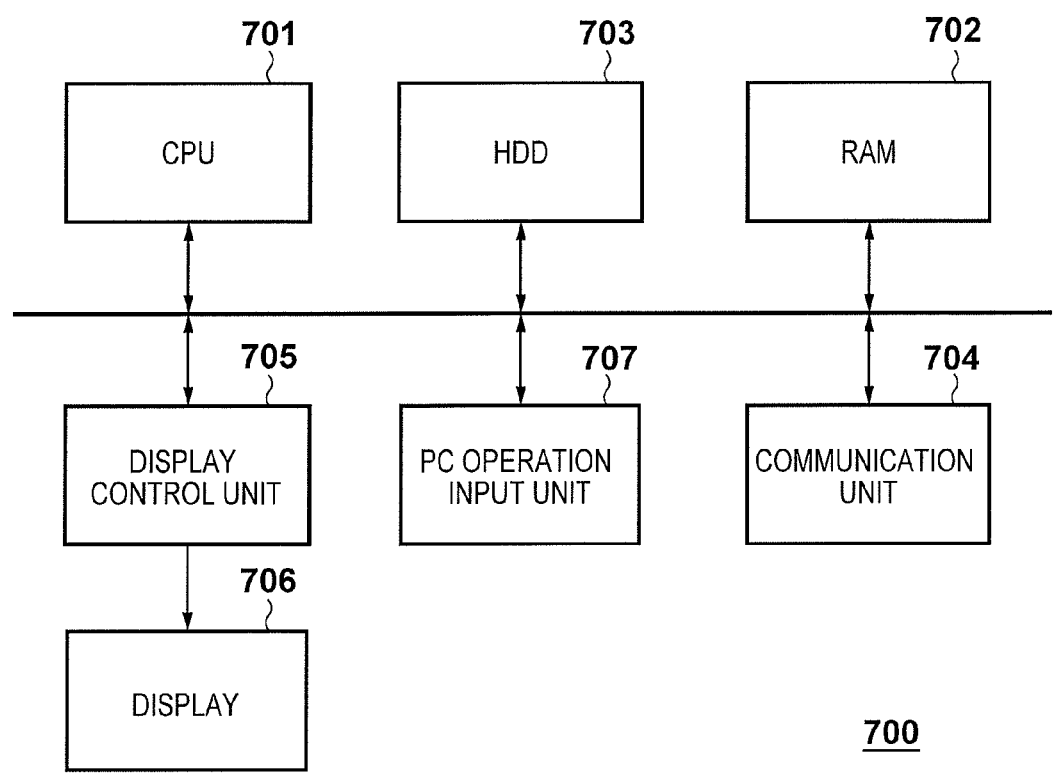
FIG. 7 is a block diagram showing the functional arrangement of the PC 700 according to the embodiment of the present invention.

First, the arrangement of the PC 700 which executes IDT processing will be explained with reference to FIG. 7. As shown in FIG. 7, the PC 700 is constructed by connecting a display 706, in addition to a CPU 701, RAM 702, HDD 703, communication unit 704, display control unit 705, and PC operation input unit 707 which are connected via an internal bus.

The CPU 701 controls the operation of each block of the PC 700. More specifically, the CPU 701 controls the operation of each block by, for example, reading out an application program which is recorded in the HDD 703 and executes IDT processing, loading the application program to the RAM 702, and executing it.

The RAM 702 is a rewritable volatile memory. The RAM 702 is used as a working memory for an application program, and also stores intermediate data and the like output in the operation of each block of the PC 700.

The HDD 703 is a recording device of the PC 700. In addition to an application program which executes IDT processing, the HDD 703 records image data and other data. The embodiment assumes that moving image data recorded by recording processing in the digital video camera 100 is recorded in the HDD 703. Moving image data may be recorded in the HDD 703 by, for example, moving or copying the moving image data from the recording medium 112 connected to an interface (not shown), or receiving it from the digital video camera 100 via the communication unit 704. Note that the communication unit 704 is a communication interface of the PC 700 and is configured to transmit/receive data by, for example, wireless communication.

The display control unit 705 outputs a display signal regarding a screen to be displayed on the display 706. More specifically, the display control unit 705 receives a display control signal regarding a screen from the CPU 701, generates a display signal based on this signal, and outputs it to the display 706. For example, the display control unit 705 reads out various GUI (Graphical User Interface) data based on the display control signal, and composites these data in a video memory (not shown) to generate a GUI screen and output it as a display signal. The embodiment describes the PC 700 of a so-called laptop type which includes the display 706 as a building component. However, it will be understood that the practice of the present invention is not limited to this.

The PC operation input unit 707 is a user interface of the PC 700, including a mouse and keyboard. When the PC operation input unit 707 detects an operation input from the user, it outputs a control signal corresponding to this operation to the CPU 701.

Figure 8:
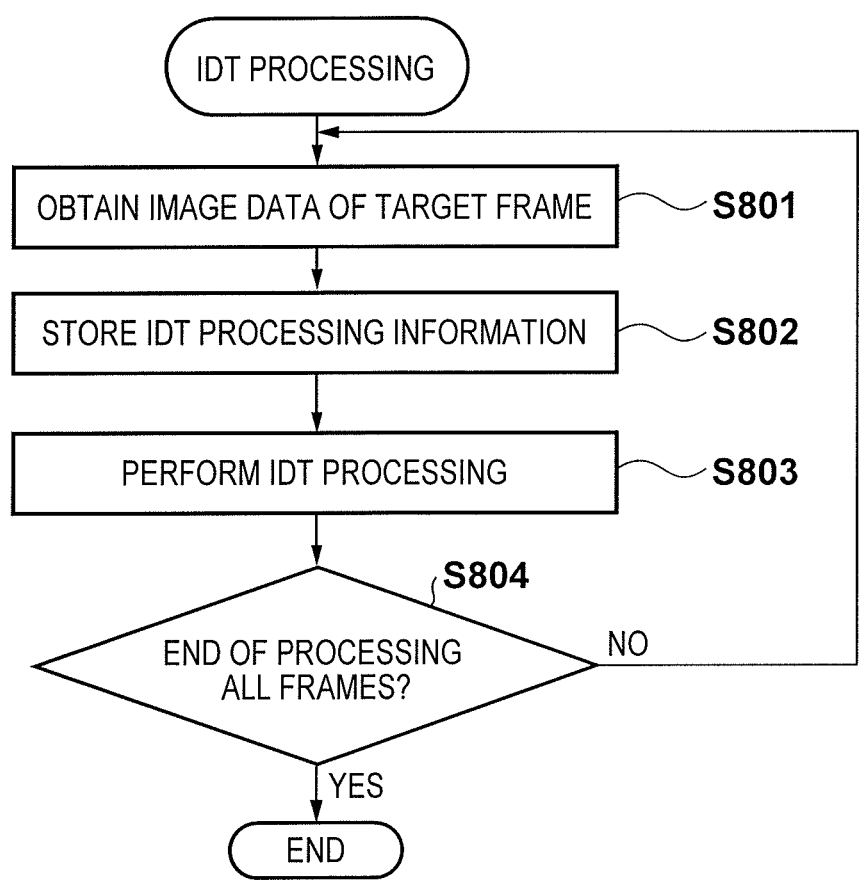
FIG. 8 is a flowchart exemplifying IDT processing to be executed in the PC 700 according to the embodiment of the present invention.

IDT processing to be executed in the PC 700 having this arrangement will be explained in detail with reference to the flowchart of FIG. 8. In the following description, this recording processing starts when, for example, a corresponding application is executed in the PC 700 and moving image data to be adapted to an ideal color response function is selected.

In step S801, the CPU 701 obtains image data regarding an unprocessed frame (target frame) out of frames of moving image data. More specifically, the CPU 701 selects a frame of moving image data as a target frame sequentially from the start frame, and performs decoding processing on data of the frame, obtaining corresponding image data. The obtained image data is stored in the RAM 702.

In step S802, the CPU 701 reads out IDT processing information from the frame header of the target frame, and stores it in the RAM 702.

In step S803, the CPU 701 applies IDT processing to image data regarding the target frame by using the readout IDT processing information, and records the resultant image data as the frame of moving image data after conversion in, for example, the HDD 703. The IDT processing applied in this step includes the above-described de-gamma processing, ACES color balance correction processing, and ACES color space conversion processing. In the IDT processing, not all the three processes, but at least some of these processes may be performed. In this case, image data suffices to be associated with IDT processing information regarding corresponding processing.

In step S804, the CPU 701 determines whether the IDT processing has been executed for all the frames of the moving image data. If the CPU 701 determines that the IDT processing has been executed for all the frames, it terminates the IDT processing. If the CPU 701 determines that there is an unprocessed frame, it returns the process to step S801.

By this processing, the PC 700 serving as an external apparatus can execute appropriate IDT processing after accurately recognizing imaging parameters regarding IDT processing. That is, conversion into image data corresponding to an ideal color response function can be implemented without requiring input of IDT processing information by the user.

The embodiment has described that concrete processing parameters such as a matrix used for conversion processing are recorded as IDT processing information. However, the practice of the present invention is not limited to this. For example, when the digital video camera 100 and an application to be executed in the PC 700 are associated, link information which designates predetermined processing parameters in the application may be recorded as IDT processing information. It is also possible to record, as IDT processing information, imaging parameters necessary for specifying or generating processing parameters, and specify or generate processing parameters from the information in an external apparatus, as described in information obtaining processing.

As described above, the information processing apparatus according to the embodiment can generate image data capable of preferably implementing input response characteristic conversion processing. More specifically, the information processing apparatus obtains a sensed image, and information representing imaging conditions used when this image was sensed. Based on the information representing the imaging conditions, the information processing apparatus generates conversion information corresponding to a conversion coefficient used in at least either de-gamma processing or color balance correction processing for converting a sensed image into an image corresponding to a predetermined color response function. The information processing apparatus records the generated conversion information in association with the sensed image.

[Second Embodiment]

The above-described embodiment has explained the method of deciding and associating IDT processing information for each frame during recording processing in the digital video camera 100. The second embodiment will explain a method of associating IDT processing information with only a frame in which a change has occurred, instead of associating IDT processing information with the frame headers of all frames. Note that a digital video camera 100 and PC 700 in the embodiment have the same arrangements as those in the first embodiment, and a description thereof will not be repeated.

<<Recording Processing>>

Figure 9:
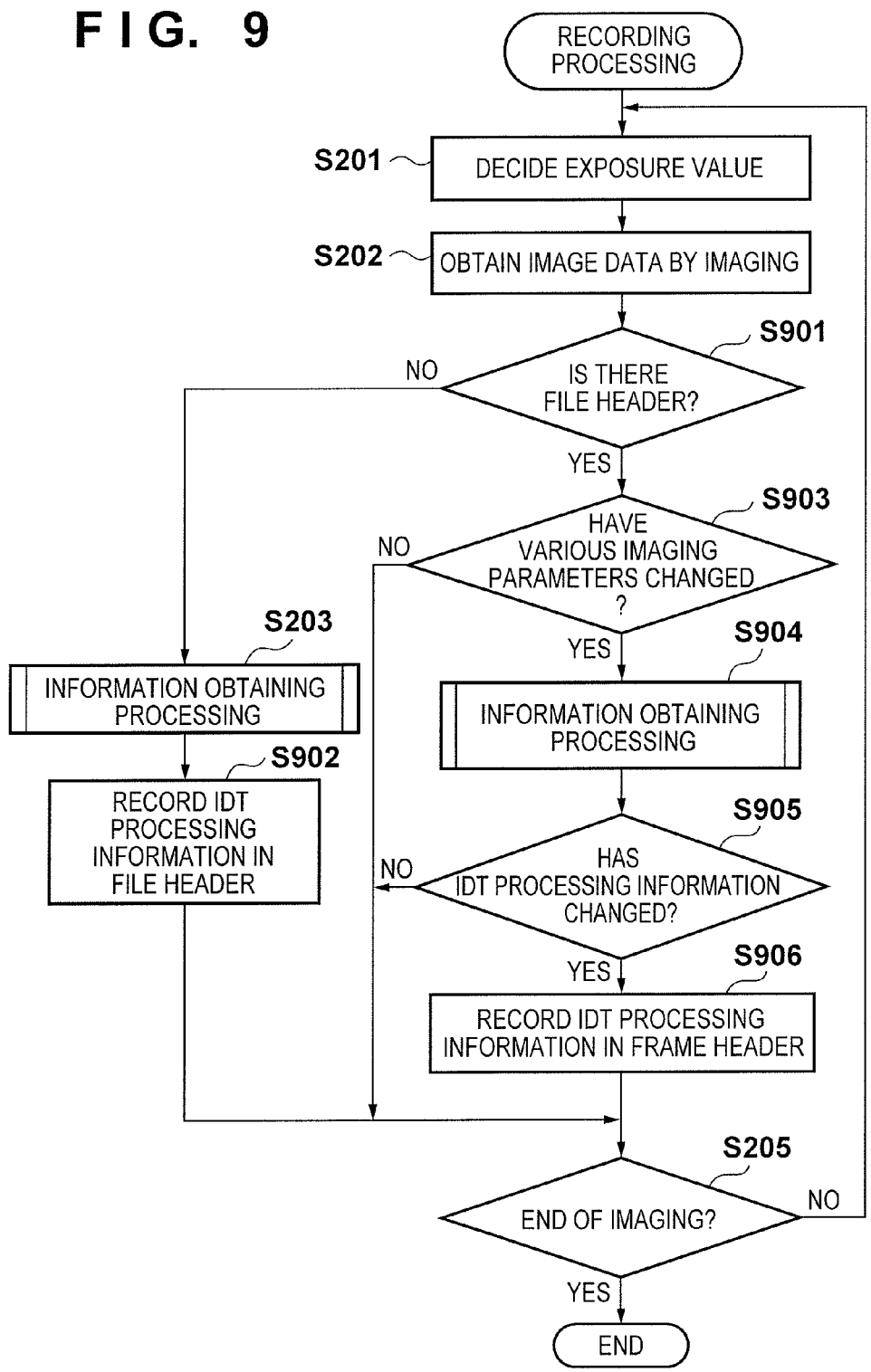
FIG. 9 is a flowchart exemplifying recording processing to be executed in a digital video camera 100 according to the second embodiment of the present invention.

Recording processing to be executed in the digital video camera 100 according to the embodiment will be explained in detail with reference to the flowchart of FIG. 9. In the recording processing according to the embodiment, the same reference numerals as those in the recording processing according to the first embodiment described above denote steps of performing the same processes, and a description thereof will not be repeated. Only steps of performing characteristic processing in the second embodiment will be explained.

After image data serving as a frame of a moving image is output in step S202, a system controller 101 determines in step S901 whether there is the file header of moving image data to be recorded. If the system controller 101 determines that there is the file header of moving image data, it shifts the process to step S903. If the system controller 101 determines that there is no file header of moving image data, it shifts the process to step S203.

After executing information obtaining processing to obtain IDT processing information in step S203, the system controller 101 sets the obtained IDT processing information in the file header of moving image data to be recorded, and records it on a recording medium 112 via a recording medium I/F 111 in step S902. Then, the system controller 101 shifts the process to step S205.

If the system controller 101 determines in step S901 that there is the file header, it determines in step S903 whether various imaging parameters regarding IDT processing information have changed. More specifically, various imaging parameters corresponding to IDT processing information recorded in the file header or frame header immediately before current parameters are stored in the memory 107. The system controller 101 compares these parameters with the current parameters to determine whether the parameters have changed. If the system controller 101 determines that various imaging parameters have changed, it shifts the process to step S904. If the system controller 101 determines that these parameters have not changed, it shifts the process to step S205.

In step S904, the system controller 101 executes information obtaining processing, obtaining IDT processing information corresponding to the changed imaging parameters.

In step S905, the system controller 101 determines whether the obtained IDT processing information has changed from IDT processing information recorded in the file header or frame header immediately before the obtained IDT processing information. For example, when the user performs imaging with the digital video camera 100 while moving outdoors from the inside of a room, the light source changes, the white balance coefficient thus changes, and IDT processing information regarding ACES color balance correction processing changes in some cases. At this time, when a coordinate value at which a detected white balance coefficient is mapped changes from a point 502 to a point 501, as shown in FIG. 5, the Euclidean distance changes from a state close to a light source A2 to a state close to a light source A1, so the IDT processing information needs to be changed. Note that a point 503 during transition is in a state close to the light source A2 and does not change, and IDT processing information need not be changed.

If the system controller 101 determines that the obtained IDT processing information has changed from IDT processing information recorded immediately before the obtained IDT processing information, it shifts the process to step S906. If the system controller 101 determines that the obtained IDT processing information has not changed, it shifts the process to step S205.

In step S906, the system controller 101 sets the IDT processing information obtained by the information obtaining processing in a frame header corresponding to the image data, and records it on the recording medium 112 via the recording medium I/F 111. Note that the IDT processing information contained in the frame header need not include all coefficients regarding de-gamma processing, ACES color balance correction processing, and ACES color space conversion processing, and may include only a changed coefficient or only the difference of a changed coefficient.

By this processing, the digital video camera 100 according to the embodiment can associate IDT processing information with only a frame in which a change has occurred, and can reduce the file size of moving image data.

When applying IDT processing to moving image data recorded in this way, IDT processing information recorded in a file header is used from the start frame up to a frame in which IDT processing information is recorded in the frame header. In subsequent frames, IDT processing information recorded in the frame header is used till the next frame in which IDT processing information is recorded in the frame header, and then processing is performed.

[Third Embodiment]

The above-described first and second embodiments have explained that the digital video camera 100 generates and records IDT processing information necessary for IDT processing, that is, the digital video camera 100 manages information necessary to generate IDT processing information. However, it is not practice to store, in the digital video camera 100, information necessary to generate pieces of IDT processing information for all imaging conditions. An optical system and the like to be mounted in the digital video camera 100 may be commercialized later, and the digital video camera 100 is less likely to have in advance information capable of coping with such a product. The third embodiment will explain a form in which when a digital video camera 100 and PC 700 are connected to perform imaging, the PC 700 transmits, to the digital video camera 100, information which is supplied from, for example, an application program and is necessary to generate IDT processing information.

<<Recording Processing>>

Figure 10:
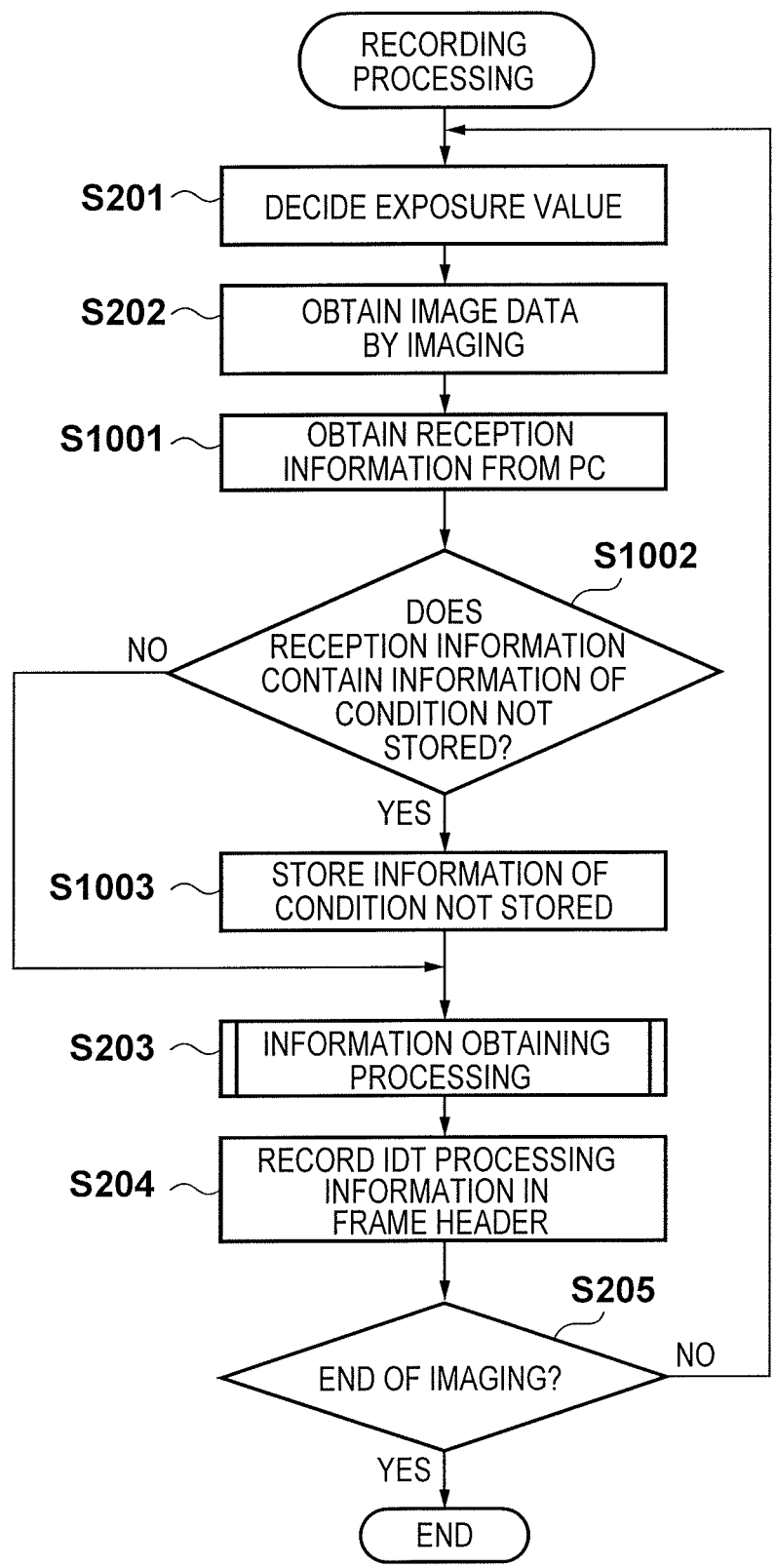
FIG. 10 is a flowchart exemplifying recording processing to be executed in a digital video camera 100 according to the third embodiment of the present invention.

Recording processing to be executed in the digital video camera 100 according to the embodiment will be explained in detail with reference to the flowchart of FIG. 10. In the recording processing according to the embodiment, the same reference numerals as those in the recording processing according to the above-described first embodiment denote steps of performing the same processes, and a description thereof will not be repeated. Only steps of performing characteristic processing in the third embodiment will be explained.

After image data serving as a frame of a moving image is output in step S202, a system controller 101 receives, from the PC 700 via an external input I/F 114 in step S1001, information (reception information) necessary to generate IDT processing information.

In step S1002, the system controller 101 compares information which is stored in a nonvolatile memory 102 and is necessary to generate IDT processing information, with the reception information received from the PC 700, and determines whether the reception information contains information of a condition not stored in the nonvolatile memory 102. If the system controller 101 determines that the reception information contains information of a condition not stored in the nonvolatile memory 102, it shifts the process to step S1003. If the system controller 101 determines that the reception information does not contain information of a condition not stored in the nonvolatile memory 102, it shifts the process to step S203.

Figure 11:
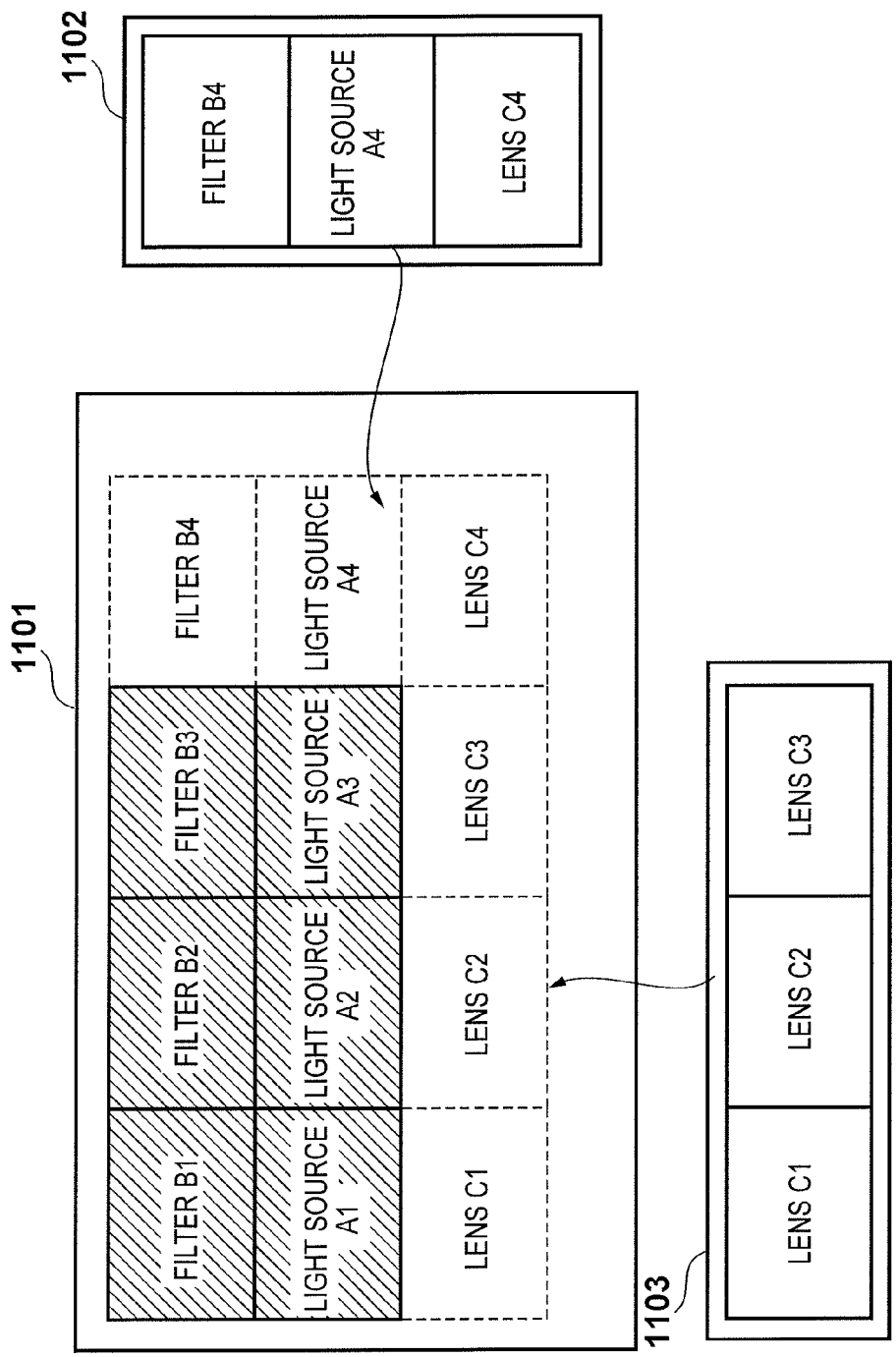
FIG. 11 is a view exemplifying a color balance transformation matrix configuration method according to the third embodiment of the present invention.

In step S1003, the system controller 101 stores, in the nonvolatile memory 102, the information of the condition not stored in the nonvolatile memory 102, out of the reception information, and shifts the process to step S203. For example, when the information which is stored in the nonvolatile memory 102 and is necessary to generate IDT processing information is information at a hatched portion in 1101 of FIG. 11, pieces of information 1102 and 1103 contained in the reception information are stored in the nonvolatile memory 102. Note that the information to be stored may be information of a condition associated with the digital video camera 100, out of the reception information.

By this processing, even if the digital video camera 100 according to the embodiment does not have in advance information necessary to generate IDT processing information, it can externally obtain information and record IDT processing information corresponding to an imaging condition in association with image data.

Although different aspects of the present invention have been described in detail in the first to third embodiments, all or some of these aspects may be combined, as a matter of course.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-152099, filed Jul. 22, 2013, which is hereby incorporated by reference herein in its entirety.

What is claimed is:

1. An information processing apparatus comprising:
   an image processor configured to obtain a sensed image, and information representing an imaging condition used for sensing of the sensed image;
   a generation processor configured to generate, based on the information representing the imaging condition, conversion information corresponding to a conversion coefficient used in conversion processing of converting the sensed image into an image corresponding to a predetermined color response function independent of an image sensing apparatus; and
   a recording processor configured to record, in association with the sensed image, the conversion information generated by said generation processor,
   wherein in case where the sensed image is a frame of a moving image, and the conversion coefficient generated by said generation processor has changed from a conversion coefficient recorded immediately before the generated conversion coefficient, said recording processor records conversion information corresponding to the generated conversion coefficient.

2. The apparatus according to claim 1, wherein the conversion processing includes at least one of de-gamma processing and color balance correction processing.

3. The apparatus according to claim 2, wherein the information representing the imaging condition regarding the de-gamma processing contains information of gamma processing applied to the sensed image.

4. The apparatus according to claim 3, wherein the information representing the imaging condition regarding the de-gamma processing further contains a gain value and an ISO sensitivity.

5. The apparatus according to claim 2, wherein the information representing the imaging condition regarding the color balance correction processing contains one of a white balance coefficient applied to the sensed image, information regarding a setting of an image sensor in imaging, and information specifying an optical system used in imaging.

6. The apparatus according to claim 5, wherein the information regarding the setting of the image sensor contains at least one of an ISO sensitivity setting and a frame rate.

7. The apparatus according to claim 5, wherein the information specifying the optical system used in imaging contains at least one of a diaphragm condition and a focal position.

8. The apparatus according to claim 1, wherein said generation processor generates the conversion information based on information which is obtained from an external apparatus and is necessary to generate the conversion information.

9. The apparatus according to claim 1, wherein the predetermined color response function includes a color response function defined by Academy Color Encoding Specification.

10. An image sensing apparatus comprising:
    an image sensor;
    an image processor configured to, when said image sensor performs imaging, obtain information representing an imaging condition used for sensing of the sensed image;
    a generation processor configured to generate, based on the information representing the imaging condition, conversion information corresponding to a conversion coefficient used in conversion processing of converting the sensed image into an image corresponding to a predetermined color response function independent of an image sensing apparatus; and
    a recording processor configured to record, in association with the sensed image, the conversion information generated by said generation processor,
    wherein in case where the sensed image is a frame of a moving image, and the conversion coefficient generated by said generation processor has changed from a conversion coefficient recorded immediately before the generated conversion coefficient, said recording processor records conversion information corresponding to the generated conversion coefficient.

11. An information processing apparatus control method, comprising:
    an obtaining step of obtaining a sensed image, and information representing an imaging condition used for sensing of the sensed image;
    a generation step of generating, based on the information representing the imaging condition, conversion information corresponding to a conversion coefficient used in conversion processing of converting the sensed image into an image corresponding to a predetermined color response function independent of an image sensing apparatus; and
    a recording step of recording, in association with the sensed image, the conversion information generated in the generation step,
    wherein in case where the sensed image is a frame of a moving image, and the conversion coefficient generated in the generation step has changed from a conversion coefficient recorded immediately before the generated conversion coefficient, conversion information corresponding to the generated conversion coefficient is recorded in the recording step.

12. A non-transitory computer-readable recording medium recording a program for causing a computer to execute the following steps comprising:
    an obtaining step of obtaining a sensed image, and information representing an imaging condition used for sensing of the sensed image;
    a generation step of generating, based on the information representing the imaging condition, conversion information corresponding to a conversion coefficient used in conversion processing of converting the sensed image into an image corresponding to a predetermined color response function independent of an image sensing apparatus; and
    a recording step of recording, in association with the sensed image, the conversion information generated in the generation step,
    wherein in case where the sensed image is a frame of a moving image, and the conversion coefficient generated in the generation step has changed from a conversion coefficient recorded immediately before the generated conversion coefficient, conversion information corresponding to the generated conversion coefficient is recorded in the recording step.

* * * * *